(No Model.)
A. NUTTING.
COUPLING TOOL.
No. 369,731. Patented Sept. 13, 1887.
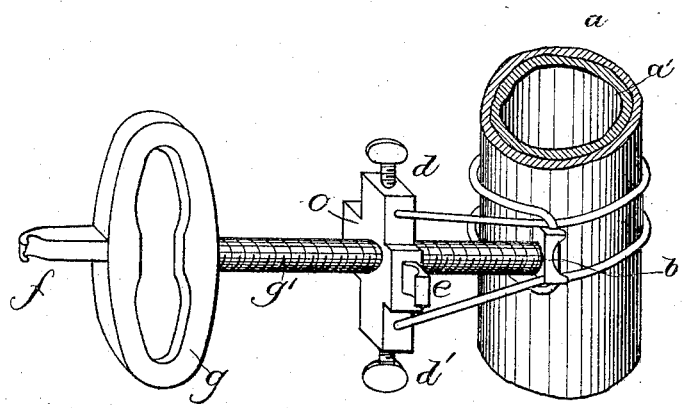
Witnesses
Jas. F. Maloney.
Herbert G. White.
Inventor,
Abel Nutting.
by Josiah Quincy
Att'y.

UNITED STATES PATENT OFFICE.

ABEL NUTTING, OF QUINCY, MASSACHUSETTS.

COUPLING-TOOL.

SPECIFICATION forming part of Letters Patent No. 369,731, dated September 13, 1887.

Application filed June 28, 1887. Serial No. 242,717. (No model.)

*To all whom it may concern:*

Be it known that I, ABEL NUTTING, a citizen of the United States, residing at Quincy, in the county of Norfolk and Commonwealth of Massachusetts, have invented a new and useful Improvement in Coupling-Tools, of which the following is a specification.

The object of my invention is to provide a simple and easy means of fastening a wire around a hose where a coupling is inserted into it and drawing the wire so tight that the hose binds closely against the coupling and prevents leakage. For this purpose a closed wire loop is now commonly used, adjusted by a pair of nippers or tongs. One end of the loop is passed through the other and bent back after the wire has been drawn as tight as possible. As the wire is necessarily stiff, it is not easy to get sufficient purchase on it to draw it tight enough to hold the coupling securely in place and to prevent leakage.

By the use of my improved coupling-tool a piece of straight wire can be used as well as a closed loop, and the wire can easily be drawn to almost any degree of tightness.

In the accompanying drawing, which represents a perspective view of my coupling-tool and its application to a hose in fastening a wire around the same, $a$ is a piece of hose, into which a coupling, $a'$, (shown in the drawing as cut off,) is inserted.

$g\ g'$ is a thumb-screw, on which works a screw-threaded socket, $c$, with clamps $d\ d'$ and a hook, $e$. Swiveled on the end of the thumb-screw is a recessed block or loop-holder, $b$.

The tool is used as follows: Take a piece of wire of suitable length, bend a loop, as shown in the drawing, in the middle of it, carry the double wire round the hose, pass the ends under the loop, and place the loop-holder in position, as shown. Then pass the ends of the wire into the holes beneath the clamps $d\ d'$, screw the clamps tightly down, and turn the thumb-screw so as to carry the threaded socket $c$ upward until the wires are drawn as tight as desired upon the hose. Swing the thumb-screw from left to right in the drawing, so as to carry the ends of the wire back over the loop and bring them down upon the hose, when the clamps $d\ d'$ are unscrewed, and the operation is completed, the wire being held in place by its stiffness.

When a closed wire loop is used instead of a straight wire bent as above described, the end of the loop which is pulled through is caught upon the hook $e$, the operation being otherwise as above described. The claw $f$ is for use in pulling one end of the closed loop through the other before it is caught upon the hook $e$.

Having fully described my invention, what I desire to claim and secure by Letters Patent is—

The herein-described coupling-tool, which consists of a thumb-screw having a recessed block or loop-holder on the end thereof and a screw-threaded socket through which said thumb-screw works, said socket being provided with a suitable wire-holding device, substantially as described.

ABEL NUTTING.

Witnesses:
 JOSIAH QUINCY,
 H. E. NUTTING.